United States Patent
Spillman et al.

(10) Patent No.: US 6,780,542 B2
(45) Date of Patent: Aug. 24, 2004

(54) LITHIUM OXYHALIDE CELL WITH IMPROVED SAFETY AND VOLTAGE DELAY CHARACTERISTICS

(75) Inventors: David M. Spillman, Tonawanda, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 490 days.

(21) Appl. No.: 09/951,652

(22) Filed: Sep. 13, 2001

(65) Prior Publication Data

US 2003/0049524 A1 Mar. 13, 2003

(51) Int. Cl.$^7$ ................................................ H01M 4/58
(52) U.S. Cl. .............................. 429/231.9; 429/231.95; 429/324; 429/338; 429/344; 429/199
(58) Field of Search ..................... 429/231.9, 231.95, 429/122, 324, 338, 199, 344

(56) References Cited

U.S. PATENT DOCUMENTS

| | | | |
|---|---|---|---|
| 4,608,322 A | 8/1986 | Howard et al. | |
| 4,781,995 A | 11/1988 | Giner | |
| 4,797,379 A | 1/1989 | Patel et al. | |
| 4,853,304 A | 8/1989 | Ebner et al. | |
| 5,569,558 A | * 10/1996 | Takeuchi et al. | ............ 429/122 |

* cited by examiner

Primary Examiner—Bruce F. Bell
(74) Attorney, Agent, or Firm—Michael F. Scalise

(57) ABSTRACT

The present invention is directed to providing a lithium carbonate passivation layer on lithium through exposure of the active material to gaseous carbon dioxide prior to cell assembly. This results in an electrochemical cell which possesses improved safety and voltage delay characteristics in comparison to prior art cells comprising unexposed lithium. The preferred cell is of a lithium oxyhalide chemistry.

21 Claims, 3 Drawing Sheets

LITHIUM OXYHALIDE CELL WITH IMPROVED SAFETY AND VOLTAGE DELAY CHARACTERISTICS

BACKGROUND OF THE INVENTION

1. Field of the Invention

The present invention generally relates to the art of electrochemical cells and, more particularly, to a lithium-containing cell with improved voltage delay characteristics. In general, it has been discovered that exposing lithium to gaseous carbon dioxide improves the safety and voltage delay characteristics of a cell containing the active material, regardless of whether the cell is of a primary or of a secondary chemistry. The present invention is particularly applicable to lithium oxyhalide cells.

2. Prior Art

Primary lithium oxyhalide cells are used extensively in applications requiring high gravimetric and volumetric energy density. Among the many sizes and chemistries available, cells can be developed for low rate or high rate applications and to operate from temperatures as low as $-70°$ C. to as high as $200°$ C. The anode material usually consists of lithium or lithium alloyed with various elements such as aluminum, magnesium or boron and the cathode usually consists of some form of carbon which is held together using a suitable binder. The electrolyte generally consists of a solvent system of thionyl chloride, phosphoryl chloride or sulfuryl chloride. Often, additional compounds or interhalogen compounds such as sulfur dioxide, chlorine, bromine, bromine chloride and others may be dissolved therein to modify the cell for a particular purpose, such as extending the operating rate or temperature of the cell. Electrolyte salts are also added to the solvent system to assist in ionic transfer during cell discharge. Such salts may include lithium chloride in combination with aluminum trichloride or gallium trichloride. Lithium tetrachloroaluminate salt (LAC) or lithium tetrachlorogallate salt (LGC) is then formed in-situ. Typically used catholytes include chlorinated sulfuryl chloride (CSC) having either LAC or LGC dissolved therein. These systems are commonly referred to as LAC/CSC and LGC/CSC.

While lithium oxyhalide cells are well known for their high energy and power density, there are some drawbacks to their use in particular situations. Unlike other pulse dischargeable lithium primary cells containing solid cathode systems and organic-based electrolytes, such as the lithium/silver vanadium oxide system (Li/SVO) or the lithium/manganese dioxide system (Li/MnO$_2$), lithium oxyhalide cells are more prone to exhibit voltage delay under some use conditions.

The voltage delay phenomenon manifests itself as a rapid decrease in discharge voltage when an external load is placed upon the cell or battery, such as during the application of a short duration pulse or during a pulse train. Voltage delay can take one or both of two forms. One form is that the leading edge potential of the first pulse is lower than the end edge potential of the first pulse. In other words, the voltage of the cell at the instant the pulse is applied is lower than the voltage of the cell immediately before the first pulse is removed. The second form of voltage delay is that the minimum potential of the first pulse is lower than the minimum potential of the last pulse when a series of pulses have been applied. FIG. 1 is a graph showing an illustrative discharge curve 10 as the voltage response of a cell that exhibits both forms of voltage delay. In extreme cases, the voltage may drop so low that the cell or battery is rendered useless. Generally, the voltage recovers or rises to an acceptable level over a period of several seconds or minutes. Especially in a lithium oxyhalide cell, it is well known that the voltage delay phenomenon becomes more problematic as the cell ages, as the storage temperature increases, as the discharge rate increases and as the discharge temperature of the cell decreases.

The voltage response of a pulse dischargeable cell which does not exhibit voltage delay during the application of a short duration pulse or pulse train has distinct features. First, the cell potential decreases throughout the application of the pulse until it reaches a minimum at the end of the pulse, and second, the minimum potential of the first pulse in a series of pules is higher than the minimum potential of the last pulse. FIG. 2 is a graph showing an illustrative discharge curve 12 as a typical or "ideal" response of a cell during the application of a series of pulses as a pulse train that does not exhibit voltage delay.

In the lithium oxyhalide chemistry, the voltage delay phenomenon is primarily attributed to a passivation layer which forms on the lithium anode as the catholyte is filled into the cell. Prior to filling, the passivation layer primarily consists of oxygenated surface species formed from reaction of the anode with oxygen in the dry air cell assembly environment. When the cell casing is filled with the catholyte solution, a more robust passivation layer consisting of lithium chloride and various electrolyte salt species is formed. This passivation layer prevents the cell from internally short circuiting since the electrolyte itself is consumed during discharge; however, it also causes an additional resistance within the cell which must be overcome during discharge. It is generally recognized that modification of the lithium passivation layer is critical to improving the voltage delay characteristics of lithium oxyhalide cells.

It is a premise of the present invention that lithium carbonate possesses many of the same properties as lithium chloride. Lithium chloride is the predominant compound of the passivation layer in a LAC/CSC or LGC/CSC system. Among these, lithium carbonate is stable throughout the temperature range in which lithium oxyhalide cells are used, it is electrically non-conductive and ionically conductive, and it is non-reactive with strong oxidizing agents such as thionyl chloride, phosphoryl chloride and sulfuryl chloride.

Accordingly, the present invention is directed to providing a lithium carbonate passivation layer on lithium active material through exposure to gaseous carbon dioxide prior to cell assembly. This results in an electrochemical cell which possesses improved safety and voltage delay characteristics in comparison to prior art cells where lithium is not so exposed. These benefits are realized in cells of a primary chemistry having a solid cathode or of an oxyhalide type, or a cell of a secondary chemistry.

SUMMARY OF THE INVENTION

In the preferred oxyhalide chemistry, the present invention provides an electrochemical cell of high energy density including an alkali metal anode, a cathode current collector of electrically conductive and/or electroactive material and an tonically conductive catholyte solution operatively associated with the anode and the cathode current collector. The catholyte consists essentially of a first depolarizer component selected from the group consisting of free halogens, interhalogens and mixtures thereof dissolved in a second depolarizer component in the form of a nonaqueous solvent or a mixture of nonaqueous solvents. A metal salt is dissolved in the catholyte solution to enhance the ionic conductivity thereof. The preferred active material for the anode is lithium, or an alloy thereof, that has been exposed to gaseous carbon dioxide prior to cell fabrication, and the preferred electrically conductive material of the cathode comprises a carbonaceous material.

The foregoing and additional advantages and characterizing features of the present invention will become clearly apparent upon a reading of the ensuing detailed description taken in conjunction with the accompanying drawings.

BRIEF DESCRIPTION OF THE DRAWING FIGURES

DETAILED DESCRIPTION OF THE PREFERRED EMBODIMENTS

Figure 1:
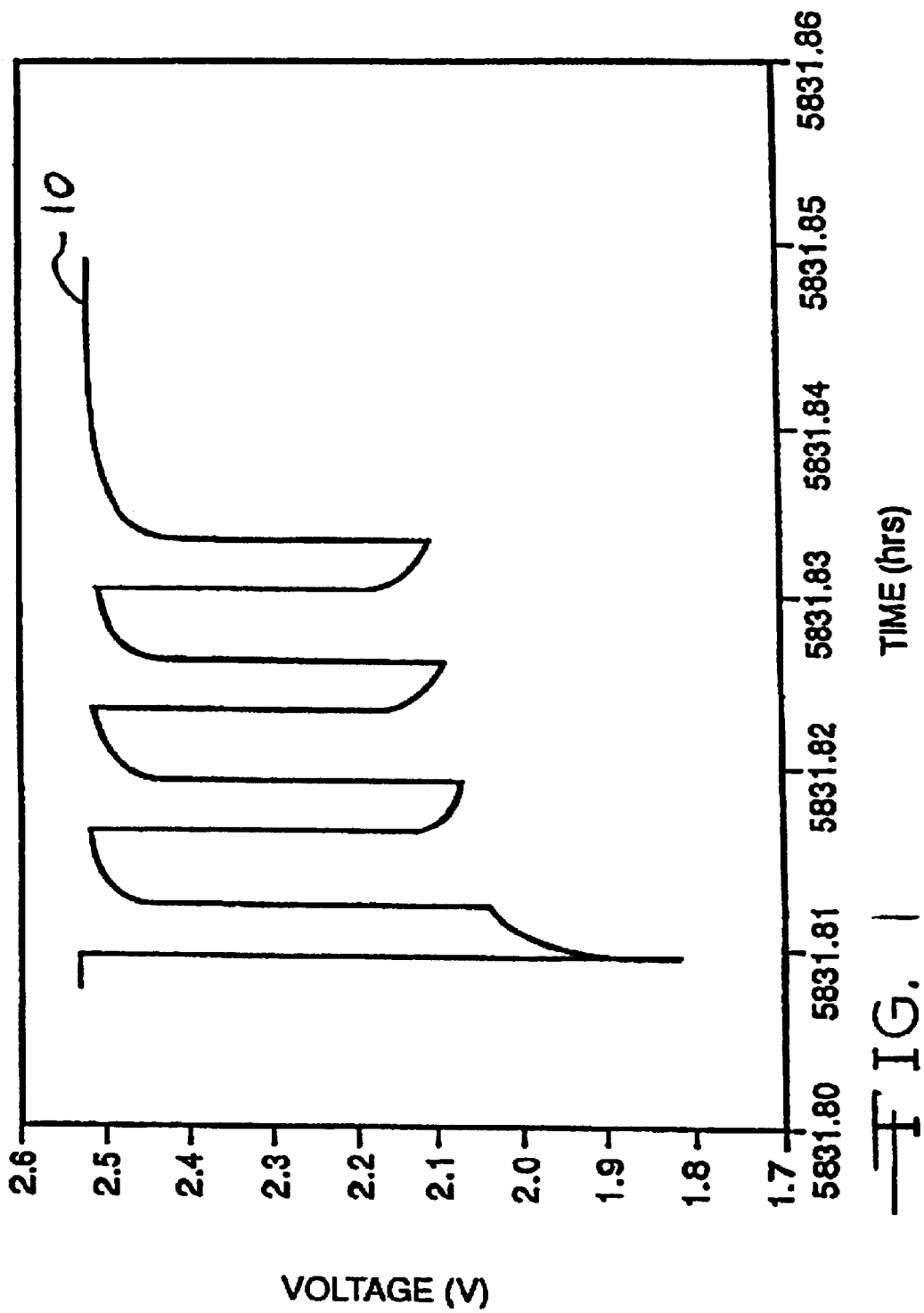
FIG. 1 is a graph showing an illustrative pulse discharge curve 10 of an exemplary electrochemical cell that exhibits voltage delay.
Figure 2:
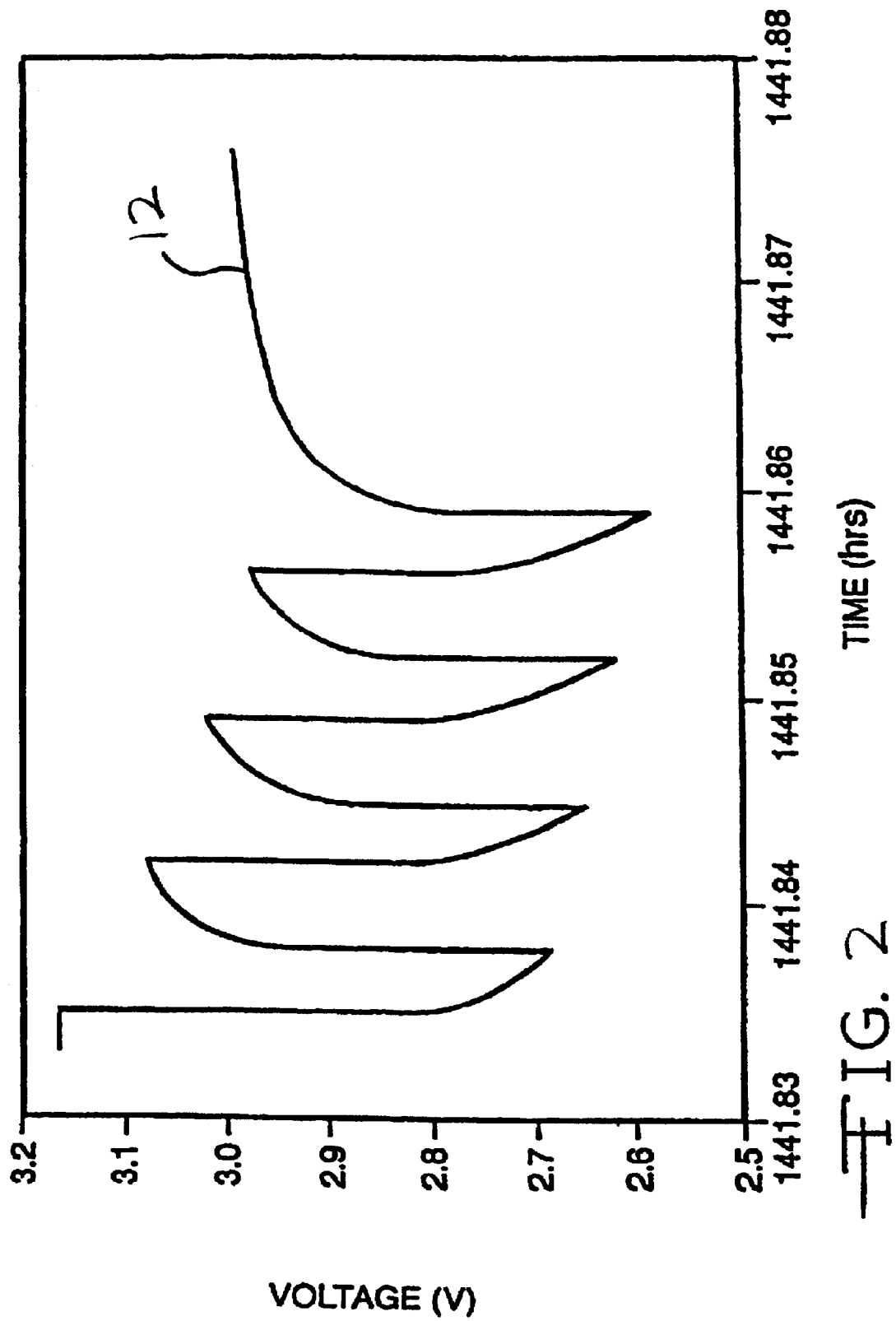
FIG. 2 is a graph showing an illustrative pulse discharge curve 12 of an exemplary electrochemical cell that does not exhibit voltage delay.

The present invention is useful in electrochemical cells of both a primary and a secondary chemistry. The primary chemistry configuration can include a positive electrode of either a solid cathode active material supported on a current collector or a liquid catholyte system having an electrically conductive or electroactive material supported on the cathode current collector.

Regardless of the cell configuration, such cells preferably comprise an anode active material of a metal selected from Groups IA, IIA or IIIB of the Periodic Table of the Elements, including the alkali metals lithium, sodium, potassium, etc., and their alloys and intermetallic compounds including, for example, Li—Mg, Li—Si, Li—Al, Li—B, Li—Al—Mg and Li—Si—B alloys and intermetallic compounds. The preferred anode active material comprises lithium, and the more preferred anode for a primary cell comprises a lithium alloy such as a lithium-aluminum alloy. However, the greater the amount of aluminum present by weight in the alloy, the lower the energy density of the cell.

In a primary cell of either a solid positive electrode or an oxyhalide chemistry, the form of the anode may vary. Preferably the anode is a thin metal sheet or foil of the anode metal, pressed or rolled on a metallic anode current collector, i.e., preferably comprising nickel, to form an anode component. The anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

According to the present invention and regardless of the cell being of an oxyhalide chemistry or of a primary or a secondary chemistry comprising a solid positive electrode, the lithium or lithium alloy anode in whatever form it is manufactured is first treated with gaseous carbon dioxide before being incorporated into the cell system. This treatment can take various forms, but typically consists of first rendering the external surface of the active material in a nearly virgin state. One way to do this is to vigorously contact the lithium with a brush of horse hair and the like. Another way is to "sand blast" the active material. The thusly cleaned lithium is then subjected or otherwise exposed to an atmosphere of carbon dioxide. This can take the form of flowing carbon dioxide or a stagnant atmosphere. A preferred method is to perform the brushing in a flowing carbon dioxide atmosphere. The exposure time is preferably at least five minutes, and more preferably about 15 minutes, or more, at ambient temperature and pressure conditions.

In the case of an oxyhalide chemistry, the cell comprises a cathode current collector of electrically conductive material supported on a conductive substrate. An oxyhalide cell operates in the following manner. When the tonically conductive catholyte solution becomes operatively associated with the anode and the cathode current collector, an electrical potential difference develops between terminals operatively connected to the anode and cathode current collector. The electrochemical reaction at the anode includes oxidation to form metal ions during cell discharge. The electrochemical reaction at the cathode current collector involves conversion of those ions which migrate from the anode to the cathode current collector into atomic or molecular forms. In addition, the halogen and/or interhalogen of the catholyte is believed to undergo a reaction or reactions with the non-aqueous solvent thereof resulting in the formation of a compound or complex which exhibits the observed open circuit voltage of the cell. Exemplary electrically conductive materials for the cathode current collector include graphite, coke, acetylene black, carbon black, and carbon monofluoride bonded on metal screens.

A preferred electrically conductive material is a "hairy carbon" material developed by growing submicron carbon filaments from carbonaceous gases. The submicron filaments typically have diameters ranging from about 0.05 $\mu$m to about 0.2 $\mu$m. This material is preferred due to its relatively high lithium-retention capacity and because hairy carbon filaments have excellent mechanical properties which permit them to be fabricated into rigid electrodes. The carbon may be contacted to a conductive substrate such as by pressing, spreading, bonding and the like. The preferred hairy carbon material is described in U.S. Pat. No. 5,443,928 to Takeuchi et al., which is assigned to the assignee of the present invention and incorporated herein by reference.

A typical cathode current collector is fabricated by mixing about 80 to 95 weight percent of at least one of the above listed electrically conductive materials with about 1 to 10 weight percent of a powdered conductive diluent and about 1 to 10 weight percent of a binder material, preferably a thermoplastic polymeric binder material. The term thermoplastic polymeric binder material is used in its broad sense and any polymeric material, preferably in a powdered form, which is inert in the cell and which passes through a thermoplastic state, whether or not it finally sets or cures, is included within the meaning "thermoplastic polymer". Representative materials include polyethylene, polypropylene and fluoropolymers such as fluorinated ethylene and propylene, polyvinylidene fluoride (PVDF), polyethylenetetrafluroethylene (ETFE), and polytetrafluoroethylene (PTFE), the latter material being most preferred. Natural rubbers are also useful as the binder material with the present invention.

Suitable conductive diluents include acetylene black, carbon black and/or graphite. A preferred carbonaceous diluent is KETJENBLACK® carbon. Metals such as nickel, aluminum, titanium and stainless steel in powder form are also useful as conductive diluents when mixed with the above listed conductive materials.

This mixture is then rolled onto a conductive substrate such as a nickel, stainless steel, or copper foil or screen.

Other cathode active materials useful for constructing either a primary or a secondary electrochemical cell are selected from fluorinated carbon, a metal, a metal oxide, a metal sulfide or a mixed metal oxide. Such electrode active materials include silver vanadium oxide, copper silver vanadium oxide, manganese dioxide, titanium disulfide, copper oxide, copper sulfide, iron sulfide, iron disulfide, cobalt oxide, nickel oxide, copper vanadium oxide, and other materials typically used in alkali metal electrochemical cells.

Suitable fluorinated carbons are represented by the formula $(CF_x)_n$ wherein x varies between about 0.1 to 1.9 and preferably between about 0.5 and 1.2 and $(C_2F)_n$ and wherein the n refers to the number of monomer units, which can vary widely. These electrode active materials are composed of carbon and fluorine, and include graphitic and nongraphitic forms of carbon, such as coke, charcoal or activated carbon.

In secondary cells, the positive electrode preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, the lithium metal comprising the positive electrode is intercalated into a carbonaceous negative electrode or anode by applying an externally generated electrical potential to recharge the cell. The applied recharging electrical potential serves to draw the alkali metal from the cathode material, through the electrolyte and into the carbonaceous anode to saturate the carbon comprising the anode. The cell is then provided with an electrical potential and is discharged in a normal manner.

An alternate secondary cell construction comprises intercalating the carbonaceous material with the active alkali material before the negative electrode is incorporated into the cell. In this case, the positive electrode body can be solid and comprise, but not be limited to, such materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air or water.

The positive electrode for a primary or a secondary cell is prepared in a similar manner as previously described with respect to fabrication of a cathode current collector for an oxyhalide cell. In that respect, the positive electrode is prepared by mixing about 80 to 99 weight percent of an already prepared electrode active material in a finely divided form with about 1 to 10 weight percent of a powdered conductive diluent and about 1 to 10 weight percent of a binder material. Suitable conductive diluents and binder materials have already been described.

Similarly, if the active material is a carbonaceous counter electrode in a secondary cell, the electrode material preferably includes a conductive diluent and a binder material in a similar manner as the previously described primary, solid cathode electrochemical cell.

The thusly prepared active admixture may be formed into a free-standing sheet prior to being contacted to a current collector to form the positive electrode. The manner in which the active admixture is prepared into a free-standing sheet is thoroughly described in U.S. Pat. No. 5,435,874 to Takeuchi et al., which is assigned to the assignee of the present and incorporated herein by reference. Further, electrode components for incorporation into a cell according to the present invention may also be prepared by rolling, spreading or pressing the active admixture onto the current collector.

Electrodes prepared as described above are flexible and may be in the form of one or more plates operatively associated with at least one or more plates of a counter electrode material, or in the form of a strip wound with a corresponding strip of counter electrode material in a structure similar to a "jellyroll".

For an oxyhalide chemistry, the cell further comprises a nonaqueous, ionically conductive catholyte operatively associated with the anode and the cathode current collector. In a cell chemistry having a solid positive electrode, the anode and cathode electrodes are activated with an ionically conductive electrolyte. In either case, the catholyte and the electrolyte serve as a medium for migration of ions between the anode and the cathode current collector in the case of the oxyhalide chemistry and between the anode and the cathode electrodes in the solid positive electrode chemistry during the cell's electrochemical reactions.

For an oxyhalide cell, suitable nonaqueous solvent depolarizers exhibit those physical properties necessary for ionic transport, namely, low viscosity, low surface tension and wettability. In the case of a catholyte, suitable nonaqueous depolarizers are comprised of an inorganic salt dissolved in a nonaqueous codepolarizer system and, more preferably, an alkali metal salt dissolved in a catholyte solution comprising a halogen and/or interhalogen dissolved in a nonaqueous solvent. The halogen and/or interhalogen serve as a soluble depolarizer. They also can serve as a cosolvent in the electrochemical cell. The halogen is selected from the group of iodine, bromine, chlorine or fluorine while the interhalogen is selected from the group of ClF, $ClF_3$, ICl, $ICl_3$, IBr, $IF_3$, $IF_5$, BrCl, BrF, $BrF_3$, $BrF_5$, and mixtures thereof. The mole ratio of any one of the above-referenced halogens and/or interhalogens dissolved in any one of the above-referenced nonaqueous organic or inorganic solvents is from about 1:6 to about 1:1.

The nonaqueous solvent depolarizer may be one of the organic solvents which is substantially inert to the anode and cathode current collector materials such as tetrahydrofuran, propylene carbonate, acetonitrile, dimethyl sulfoxide, dimethyl foramide, dimethyl acetamide and in particular halogenated organic solvents such as 1,1,1,2,3,3,3-heptachloropropane or 1,4-difluorooctachlorobutane. The nonaqueous solvent depolarizer also may be one or a mixture of more than one of the inorganic solvents which can serve as both a solvent and a depolarizer such as thionyl chloride, sulfuryl chloride, selenium oxychloride, chromyl chloride, phosphoryl chloride, phosphorous sulfur trichloride and others.

The ionic conductivity of the nonaqueous catholyte solution is preferably facilitated by dissolving a metal salt in the nonaqueous depolarizer. Examples of metal salts are lithium halides such as LiCl and LiBr and lithium salts of the $LiMX_n$ type, such as $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2$, $LiO_2CCF_3$, $LiSO_3F$, $LiB(C_6H_5)_4$, $LiCF_3SO_3$, and mixtures thereof. Suitable salt concentrations typically range between about 0.25 to about 1.5 molar.

Thus, the solution of halogen and/or interhalogens, the nonaqueous solvent depolarizer and, optionally, the ionic salt, serve as the codepolarizer and catholyte of the oxyhalide cell.

In electrochemical systems of either a primary or a secondary chemistry having a solid cathode or solid positive electrode, the nonaqueous solvent system comprises low viscosity solvents including tetrahydrofuran (THF), methyl acetate (MA), diglyme, trigylme, tetragylme, dimethyl carbonate (DMC), ethylmethyl carbonate (EMC), 1,2-dimethoxyethane (DME), diisopropylether, 1,2-diethoxyethane, 1-ethoxy, 2-methoxyethane, dipropyl carbonate, ethylmethyl carbonate, methylpropyl carbonate, ethylpropyl carbonate, diethyl carbonate, and mixtures thereof. While not necessary, the electrolyte also preferably includes a high permittivity solvent selected from cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-butyrolactone (GBL), γ-valerolactone, N-methyl-pyrrolidinone (NMP), and mixtures thereof. The nonaqueous solvent system also includes at least one of the previously described lithium salts in a concentration of about 0.8 to about 1.5 molar. For a solid cathode primary or secondary cell having lithium as the anode active material, such as of the Li/SVO couple, the preferred electrolyte is $LiAsF_6$ in 50:50, by volume, mixture of PC/DME. For a $Li/CF_x$ cell, the preferred electrolyte is 1.0M to 1.4M $LiBF_4$ in γ-butyrolactone (GBL).

When the mechanical structure or configuration of the cell requires, a separator is employed to provide physical separation between the anode and the cathode current collector for the oxyhalide cell and between the anode and the cathode in a solid positive electrode chemistry. The separator is of electrically insulative material, and the separator material also is chemically unreactive with the counter electrode materials and both chemically unreactive with and insoluble in the catholyte or the electrolyte, as the case may be. In addition, the separator material has a degree of porosity sufficient to allow flow therethrough of the catholyte or the electrolyte during the electrochemical reaction of the cell.

Illustrative separator materials include woven and non-woven fabrics of polyolefinic fibers or fluoropolymeric fibers including polyvinylidene fluoride, polyethylenetetrafluoroethylene, and polyethylenechlorotrifluoroethylene laminated or superposed with a polyolefinic or a fluoropolymeric microporous film. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.). The separator may also be composed of non-woven glass, glass fiber materials and ceramic materials.

The form of the separator typically is a sheet which is placed between the anode and the cathode current collector or between the negative and the positive electrodes, and in a manner preventing physical contact therebetween. Such is the case when the anode is folded in a serpentine-like structure with a plurality of cathode current collector plates or positive electrode plates disposed intermediate the anode folds and received in a cell casing or when the electrode combination is rolled or otherwise formed into a cylindrical "jellyroll" configuration.

The assembly of the cell described herein is preferably in the form of a wound element cell. That is, the fabricated cathode current collector or positive electrode, the anode or negative electrode and the separator are wound together in a "jellyroll" type configuration or "wound element cell stack" such that the anode or negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The cathode current collector or positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode current collector or positive electrode lead is welded to the positive terminal pin in the glass-to-metal seal and the header is welded to the case containing the electrode stack. The cell is thereafter filled with the catholyte or electrolyte solution described hereinabove and hermetically sealed such as by close-welding a stainless steel ball over the fill hole, but not limited thereto.

The above assembly describes a case-negative cell, which is the preferred construction of the exemplary cell chemistries of the present invention. As is well known to those skilled in the art, the exemplary electrochemical systems can also be constructed in case-positive configurations.

The following examples describe the manner and process of an electrochemical cell according to the present invention, and set forth the best mode contemplated by the inventors of carrying out the invention, but are not to be construed as limiting.

EXAMPLE I

In order to demonstrate the advantages attributed to the present invention, four groups of lithium/CSC (chlorinated sulfuryl chloride) C-size cells were built and tested. The cells were all built having a lithium anode and a carbonaceous cathode current collector activated with a catholyte solution. The cells of group 1 were of a conventional construction having an untreated lithium anode activated with a catholyte of LGC/CSC. The group 2 cells contained treated anodes according to the present invention activated with a LGC/CSC catholyte. The group 3 cells were of a convention construction and contained untreated anodes activated with a catholyte of LAC/CSC. Finally, the group 4 cells contained treated lithium anodes according to the present invention activated with a LAC/CSC catholyte.

The LGC/CSC catholyte consisted of lithium tetrachlorogallate salt dissolved in chlorinated sulfuryl chloride. The LAC/CSC catholyte consisted of lithium tetrachloroaluminate salt dissolved in chlorinated sulfuryl chloride. All lithium anodes were subjected to the same atmospheric conditions during manufacture except for those which were vigorously brushed and treated with gaseous carbon dioxide for a period of fifteen minutes to thereby provide a lithium carbonate passivation layer on them.

Cells from each group were then subjected to a number of safety and discharge tests to evaluate the stability and usefulness of the lithium carbonate passivation layer. When subjected to a short circuit test under a resistance of ten milliohms or less, cells from groups 2 and 4 containing the treated anodes exhibited a lower short circuit current than the prior art cells of groups 1 and 3 containing untreated anodes.

In particular, the group 1 cells containing untreated lithium anodes activated with a catholyte of LGC/CSC exhibited a peak short circuit current of about 30.2 amps to about 36.0 amps. In contrast, the group 2 LGC/CSC cells with treated lithium anodes exhibited a peak short circuit current of about 25.3 amps to about 27.0 amps. Further, the group 3 LAC/CSC cells containing untreated lithium anodes exhibited a peak short circuit current of about 27.0 amps to about 27.7 amps. In contrast, the group 4 LAC/CSC cells containing treated lithium anodes exhibited a peak short circuit current of about 25.1 amps to about 27.3 amps.

EXAMPLE II

Additional cells from each of the four groups were subjected to a shock test. The test was conducted by subjecting the cells to a 1,000 g. shock of 0.5 milliseconds in duration, ten times in each of two mutually perpendicular axes. The open circuit voltage of each cell was recorded after each shock. The shock impact did not adversely affect the discharge voltage of the present invention group 2 and 4 cells as none of them experienced a voltage drop exceeding ten milliohms. This means that the lithium carbonate passivation layer remained intact even when the cells were subjected to shock vibration conditions.

EXAMPLE III

Several cells from each of the groups were stored for one month at 72° C. and then discharged at −20° C. under a 3 ohm load. This is a relatively high load for a C-size cell, and the storage and discharge conditions are generally recognized as causing enhanced voltage delay effects in lithium oxyhalide cells. In particular, lithium oxyhalide cells tend to exhibit increased voltage delay after high temperature storage. Also, the longer the storage period, the greater the effects on voltage delay.

Figure 3:
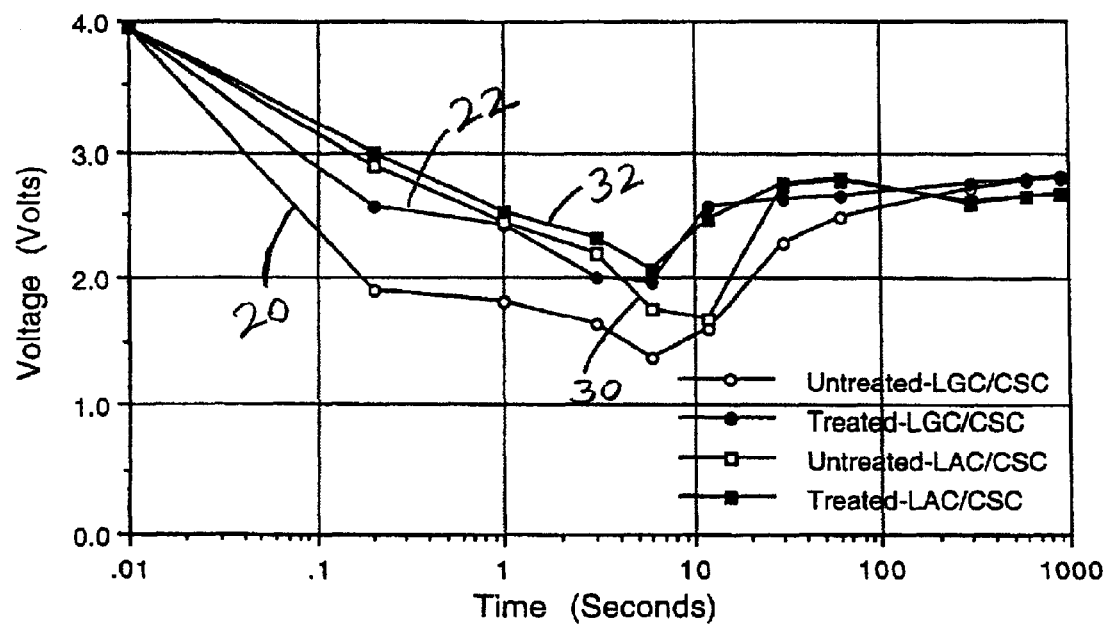
FIG. 3 is a graph of the discharge of various oxyhalide cells having lithium anodes either treated with gaseous carbon dioxide prior to cell fabrication, or left untreated.

The results are shown in FIG. 3. In this figure, curve 20 was constructed from the LGC/CSC cells with untreated anodes, curve 22 was constructed from the LGC/CSC cells with treated anode, curve 30 was constructed from the LAC/CSC cells having untreated anodes, and curve 32 was constructed from the LAC/CSC cells with treated anodes.

While all of the cells eventually recovered to an acceptable operating voltage, cells of groups 2 and 4 containing treated anodes exhibited less voltage drop and faster voltage recovery than those from groups 1 and 3 containing the untreated anodes. These results demonstrate that the lithium carbonate passivation layer which forms in a treated lithium anode according to the present invention is different than the passivation layer that forms on lithium when the anode active material is contacted by a catholyte such as the exemplary LGC/CSC and LAC/CSC systems.

Thus, according to the present invention the voltage delay phenomenon is reduced by treating lithium anodes with gaseous carbon dioxide prior to manufacture of an electrochemical system.

It is appreciated that various modifications to the inventive concepts described herein may be apparent to those skilled in the art without departing from the spirit and scope of the present invention as defined by the hereinafter appended claims.

What is claimed is:

1. An electrochemical cell, which comprises:
   a) a first electrode comprising lithium having a passivation layer of lithium carbonate provided thereon;
   b) a cathode current collector; and
   c) a catholyte comprising an inorganic depolarizer solvent provided with a halogen or an interhalogen dissolved therein, wherein the interhalogen is selected from the group consisting of $ClF$, $ClF_3$, $ICL$, $ICl_3$, $IBr$, $IF3$, $IF_5$, $BrCl$, $BrF$, $BrF_3$, $BrF_5$, and mixtures thereof.

2. The electrochemical cell of claim 1 wherein the halogen is selected from the group consisting of iodine, bromine, chlorine, fluorine, and mixtures thereof.

3. The electrochemical cell of claim 1 wherein the inorganic solvent is selected from the group consisting of thionyl chloride, sulfuryl chloride, phosphoryl chloride, and mixtures thereof.

4. The electrochemical cell of claim 1 wherein the anode comprises a lithium alloy selected from the group consisting of Li—Mg, Li—Si, Li—Al, Li—B, Li—Si—B, Li—Al—Mg, and mixtures thereof.

5. The electrochemical cell of claim 1 wherein the cathode current collector comprises a carbonaceos material.

6. The electrochemical cell of claim 1 wherein the cathode current collector comprises a hairy carbon material.

7. The electrochemical cell of claim 1 wherein the electrolyte includes at least one salt selected from the group consisting of LiCl, LiBr, and mixtures thereof.

8. The electrochemical cell of claim 7 wherein the salt concentration ranges from about 0.25 to 1.5 molar.

9. The electrochemical cell of claim 1 further including a separator provided intermediate the anode and the cathode current collector to prevent direct physical contact therebetween.

10. An electrochemical cell, which comprises:
    a) a first electrode comprising lithium having a passivation layer of lithium carbonate provided thereon;
    b) a counter electrode comprising a hairy carbon material capable of intercalating the lithium;
    c) an electrolyte activating the first electrode and the counter electrode, wherein the lithium carbonate is characterized as having been formed thereon by exposing the lithium to gaseous carbon dioxide.

11. A method for providing an electrochemical cell, comprising the steps of:
    a) subjecting lithium to a carbon dioxide atmosphere for a period of time sufficient to form a lithium carbonate passivation layer on an outer surface thereof;
    b) assembling the lithium having the lithium carbonate passivation layer thereon into the form of an anode electrode housed inside of a casing;
    c) providing a cathode current collector; and
    d) activating the anode and the cathode current collector with a catholyte comprising an inorganic depolarizer solvent provided with a halogen or an interhalogen dissolved therein.

12. The method of claim 11 including providing the lithium carbonate passivation layer by subjecting the lithium to flowing gaseous carbon dioxide.

13. The method of claim 11 including providing the lithium carbonate passivation layer by subjecting the lithium to the carbon dioxide for at least about five minutes.

14. A method for providing an electrochemical cell, comprising the steps of:
    a) subjecting lithium to a carbon dioxide atmosphere for a period of time sufficient to form a lithium carbonate passivation layer thereon;

b) assembling the lithium having the lithium carbonate passivation layer thereon into the form of a first electrode housed inside of a casing;

c) providing a counter electrode capable of intercalating the lithium; and d) activating the first electrode and the counter electrode with an electrolyte.

15. The method of claim 14 including providing the lithium carbonate passivation layer by subjecting the lithium to flowing gaseous carbon dioxide.

16. The method of claim 14 including exposing the lithium if the first electrode to gaseous carbon dioxide.

17. The method of claim 14 including brushing prior to exposure with the gaseous carbon dioxide.

18. The method of claim 14 including brushing the lithium while it is being exposed to the gaseous carbon dioxide.

19. The method of claim 14 including exposing the lithium to the gaseous carbon dioxide as either a flowing or stagnant medium.

20. The method of claim 14 including subjecting the lithium to the carbon dioxide for at least about five minutes.

21. An electrochemical cell, which comprises:

a) a first electrode comprising lithium having a passivation layer of lithium carbonate provided thereon;

b) a cathode current collector, and c) a catholyte comprising an inorganic depolarizer solvent provided with a halogen or an interhalogen dissolved therein, wherein the inorganic solvent is selected from the group consisting of thionyl chloride, sulfuryl chloride, phosphoryl chloride, and mixtures thereof.

* * * * *

UNITED STATES PATENT AND TRADEMARK OFFICE
CERTIFICATE OF CORRECTION

PATENT NO. : 6,780,542 B2
DATED : August 24, 2004
INVENTOR(S) : David M. Spillman et al.

It is certified that error appears in the above-identified patent and that said Letters Patent is hereby corrected as shown below:

Column 10,
Line 8, "ICL" should read -- ICl --;
Line 27, "LiCl, LiBr, and mixtures thereof" should read -- LiCl, LiBr, LiAlCl$_4$, LiGaCl$_4$, and mixtures thereof --;

Column 11,
Line 12, "if" should read -- of --; and
Line 13, "brushing prior" should read -- brushing the lithium prior --.

Signed and Sealed this

Seventh Day of December, 2004

JON W. DUDAS
*Director of the United States Patent and Trademark Office*